(12) United States Patent
Zelesky et al.

(10) Patent No.: US 10,815,790 B2
(45) Date of Patent: *Oct. 27, 2020

(54) TIP LEAKAGE FLOW DIRECTIONALITY CONTROL

(71) Applicant: UNITED TECHNOLOGIES CORPORATION, Hartford, CT (US)

(72) Inventors: Mark F. Zelesky, Bolton, CT (US); Andrew S. Aggarwala, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 124 days.

This patent is subject to a terminal disclaimer.

(21) Appl. No.: 15/918,190

(22) Filed: Mar. 12, 2018

(65) Prior Publication Data

US 2018/0202297 A1 Jul. 19, 2018

Related U.S. Application Data

(63) Continuation of application No. 14/143,102, filed on Dec. 30, 2013, now Pat. No. 9,951,629, which is a
(Continued)

(51) Int. Cl.
*F01D 5/18* (2006.01)
*F01D 11/10* (2006.01)
(Continued)

(52) U.S. Cl.
CPC ............. *F01D 5/187* (2013.01); *F01D 5/146* (2013.01); *F01D 5/18* (2013.01); *F01D 5/186* (2013.01);
(Continued)

(58) Field of Classification Search
CPC . F01D 5/146; F01D 5/18; F01D 5/186; F01D 5/187; F01D 5/20; F01D 9/02;
(Continued)

(56) References Cited

U.S. PATENT DOCUMENTS

| 4,390,320 A * | 6/1983 | Eiswerth | F01D 5/005 |
| | | | 29/889.1 |
| 6,790,005 B2 * | 9/2004 | Lee | F01D 5/187 |
| | | | 416/97 R |

(Continued)

*Primary Examiner* — David E Sosnowski
*Assistant Examiner* — Alexander A White
(74) *Attorney, Agent, or Firm* — Carlson, Gaskey & Olds, P.C.

(57) ABSTRACT

An airfoil according to an example includes, among other things, a suction sidewall and a pressure sidewall. A tip wall extends from a leading edge to a trailing edge and joins respective outer ends of the suction and pressure sidewalls. A tip rib extends along a pressure side of the tip wall. A tip leakage control channel is provided at the tip wall and has a floor that extends between a first control channel vane sidewall and a second control channel vane sidewall established by a corresponding tip leakage control vane. Each of the tip leakage control vanes is contiguous with and extending from a suction side surface of the tip rib. The tip leakage channel extends toward the trailing edge while extending toward the suction sidewall. One or more of an internal cavity, a channel cooling aperture, and a sidewall microcircuit may be provided.

17 Claims, 13 Drawing Sheets

Related U.S. Application Data continuation-in-part of application No. 13/540,752, filed on Jul. 3, 2012, now Pat. No. 9,260,972.

(51) Int. Cl.
*F01D 5/14* (2006.01)
*F01D 5/20* (2006.01)

(52) U.S. Cl.
CPC ............... *F01D 5/20* (2013.01); *F01D 11/10* (2013.01); *F05D 2240/307* (2013.01); *Y02T 50/673* (2013.01); *Y02T 50/676* (2013.01)

(58) Field of Classification Search
CPC .......... F01D 11/08; F01D 11/10; F01D 25/12; F05D 2220/32; F05D 2240/307; F05D 2240/55

See application file for complete search history.

(56) References Cited

U.S. PATENT DOCUMENTS

| | | | | |
|---|---|---|---|---|
| 2008/0019839 A1* | 1/2008 | Cunha | ..................... | F01D 5/187 |
| | | | | 416/96 R |
| 2015/0345301 A1* | 12/2015 | Zhang | ....................... | F01D 5/18 |
| | | | | 60/806 |

\* cited by examiner

TIP LEAKAGE FLOW DIRECTIONALITY CONTROL

CROSS-REFERENCE TO RELATED APPLICATIONS

This application is a continuation of application Ser. No. 14/143,102, which was filed on Dec. 30, 2013, which is a continuation-in-part of U.S. patent application Ser. No. 13/540,752, filed Jul. 3, 2012, issued as U.S. Pat. No. 9,260,972.

BACKGROUND

The described subject matter relates generally to turbine engines and more specifically to cooling turbine blades.

Turbine engines provide efficient, reliable power for a wide range of applications in aviation, transportation and industrial power generation. Individual compressor and turbine section(s) may be subdivided into a number of stages, formed of alternating rows of rotor blade and stator vane airfoils. Due to various operational constraints, rotor blades and stator vanes are prone to leakage of compressed gases over their tips from a higher pressure surface to a lower pressure surface. Several attempts have been made to reduce these flows, but they cannot be completely eliminated due to clearance requirements over the airfoil tips which account for variations in both thermal and centrifugal growth of adjacent components.

SUMMARY

An airfoil according to an exemplary aspect of the present disclosure includes, among other things, a suction sidewall and a pressure sidewall, each sidewall extending spanwise from an airfoil base and extending chordwise between a leading edge and a trailing edge. A tip wall extends chordwise from the leading edge to the trailing edge and joining respective outer spanwise ends of the suction and pressure sidewalls. A tip leakage control channel is recessed into the tip wall, the tip leakage control channel including a control channel floor that extends between a first control channel vane sidewall and a second control channel vane sidewall established by a corresponding tip leakage control vane. An internal cooling cavity is disposed between the suction sidewall and the pressure sidewall and a channel cooling aperture feeds airflow from the internal cooling cavity to the tip leakage control channel.

In a further non-limiting embodiment of the foregoing airfoil, the channel cooling aperture includes a curvature.

In a further non-limiting embodiment of either of the foregoing airfoils, the channel cooling aperture opens through the control channel floor.

In a further non-limiting embodiment of any of the foregoing airfoils, the channel cooling aperture divides the control channel floor into a first surface that is elevated relative to a second surface.

In a further non-limiting embodiment of any of the foregoing airfoils, the first surface extends from a tip rib suction side of a tip rib of the tip wall and the second surface extends from the suction sidewall.

In a further non-limiting embodiment of any of the foregoing airfoils, the channel cooling aperture extends to an outlet of the tip leakage control channel.

In a further non-limiting embodiment of any of the foregoing airfoils, the tip wall includes a tip outer surface having a first surface and an angled surface.

In a further non-limiting embodiment of any of the foregoing airfoils, the first surface extends from a tip shelf to a tip rib suction side of the tip wall.

In a further non-limiting embodiment of any of the foregoing airfoils, the angled surface extends radially inwardly from the first surface into the tip leakage control channel.

In a further non-limiting embodiment of any of the foregoing airfoils, a grooved BOAS is radially outward of the tip wall.

An airfoil according to another exemplary aspect of the present disclosure includes, among other things, a suction sidewall and a pressure sidewall, each sidewall extending spanwise from an airfoil base and extending chordwise between a leading edge and a trailing edge. A tip wall extends chordwise from the leading edge to the trailing edge and joining respective outer spanwise ends of the suction and pressure sidewalls. A tip leakage control channel is recessed into the tip wall and having an inlet and an outlet and an airfoil sidewall microcircuit formed in either the suction sidewall or the pressure sidewall, the airfoil sidewall microcircuit configured to feed airflow to the inlet of the tip leakage control channel.

In a further non-limiting embodiment of the foregoing airfoil, as recited in claim 11, the airfoil sidewall microcircuit includes at least one curved portion configured to alter a flow direction of the airflow within the airfoil sidewall microcircuit.

In a further non-limiting embodiment of either of the foregoing airfoils, the at least one curved portion communicates the airflow parallel to a control channel floor of the tip leakage control channel.

In a further non-limiting embodiment of any of the foregoing airfoils, an internal cooling cavity is disposed between the suction sidewall and the pressure sidewall.

In a further non-limiting embodiment of any of the foregoing airfoils, the airfoil sidewall microcircuit is formed in the suction sidewall.

An airfoil according to another exemplary aspect of the present disclosure includes, among other things, a suction sidewall and a pressure sidewall, each sidewall extending spanwise from an airfoil base and extending chordwise between a leading edge and a trailing edge. A tip wall extends chordwise from the leading edge to the trailing edge and joining respective outer spanwise ends of the suction and pressure sidewalls. A tip leakage control channel is recessed into the tip wall and having an inlet and an outlet. An internal cooling cavity is disposed between the suction sidewall and the pressure sidewall. A channel cooling aperture is in fluid communication with the internal cooling cavity and an airfoil sidewall microcircuit is formed in either the suction sidewall or the pressure sidewall. One of the channel cooling aperture or the airfoil sidewall microcircuit feeds airflow to the inlet of the tip leakage control channel.

In a further non-limiting embodiment of the foregoing airfoil, the airfoil sidewall microcircuit includes at least one curved portion configured to alter a flow direction of the airflow within the airfoil sidewall microcircuit.

In a further non-limiting embodiment of either of the foregoing airfoils, the tip leakage control channel includes a control channel floor that extends between a first control channel vane sidewall and a second control channel vane sidewall established by a corresponding tip leakage control vane.

In a further non-limiting embodiment of any of the foregoing airfoils, at least one radiused wall connects the control channel floor to at least one of the first control channel vane sidewall and the second control channel vane sidewall.

In a further non-limiting embodiment of any of the foregoing airfoils, a tip wall is shrouded by a grooved blade outer air seal (BOAS).

The embodiments, examples and alternatives of the preceding paragraphs, the claims, or the following descriptions and drawings including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
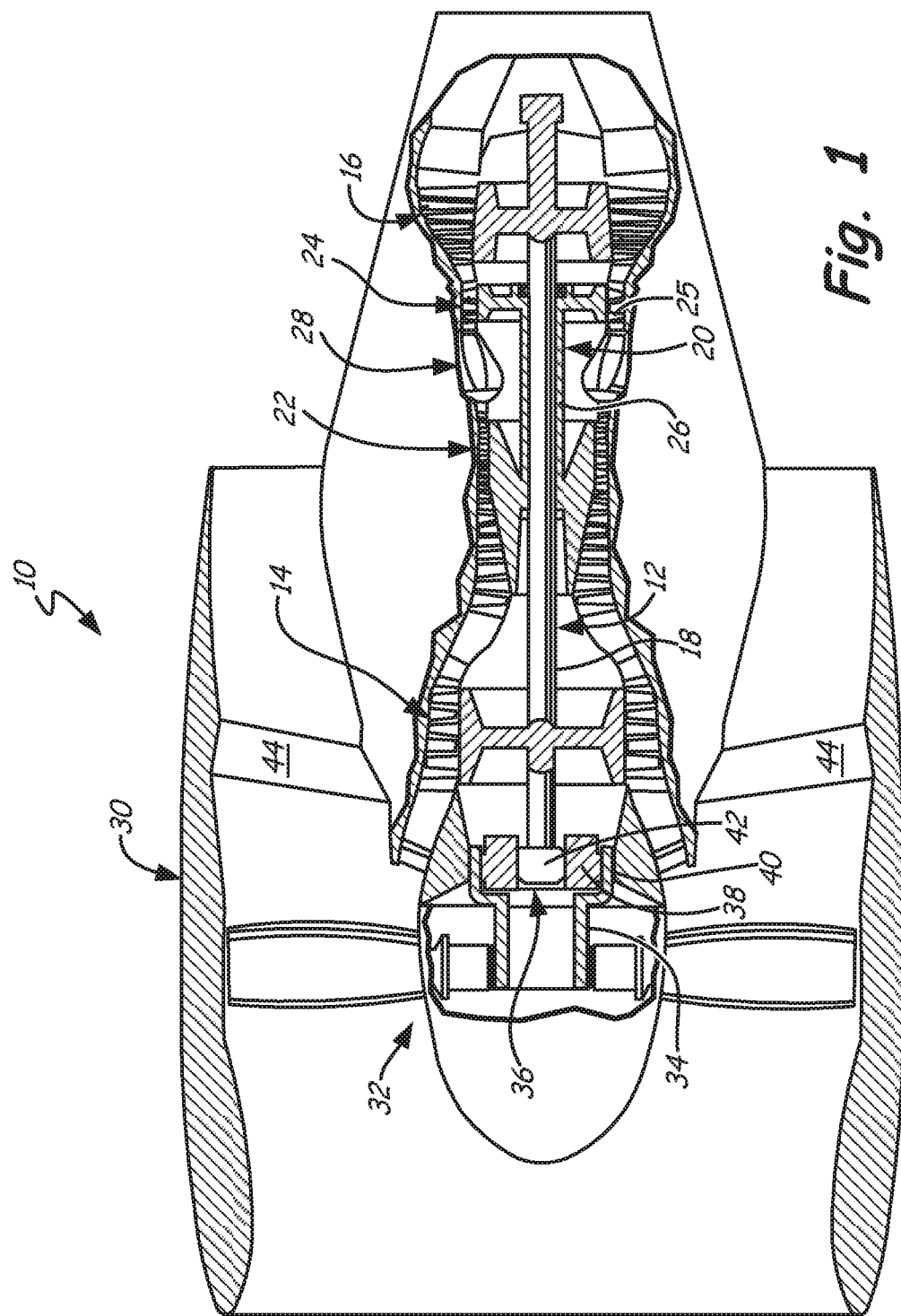
FIG. 1 schematically depicts a cross-section of a turbofan gas turbine engine.

FIG. 1 is a cross-sectional view of gas turbine engine 10, including low spool 12, low pressure compressor (LPC) 14, low pressure turbine (LPT) 16, low pressure shaft 18, high spool 20, high pressure compressor (HPC) 22, high pressure turbine (HPT) 24, rotor blades 25, high pressure shaft 26, combustor 28, nacelle 30, propulsion fan 32, fan shaft 34, fan drive gear system 36, planetary gear 38, ring gear 40, sun gear 42, and fan exit guide vanes 44.

In the example two-spool, high bypass turbofan configuration, low spool 12 includes low pressure compressor (LPC) 14 driven by low pressure turbine (LPT) 16 via low pressure shaft 18. High spool 20 includes high pressure compressor (HPC) 22 driven by high pressure turbine (HPT) 24 via high pressure shaft 26. Low pressure shaft 18 and high pressure shaft 26 are mounted coaxially and rotate at different speeds. The power core also includes combustor 28 arranged in flow series between the compressor and turbine sections. HPT 24 and LPT 16 can each include at least one stage of circumferentially distributed rotor blades 25. More details of an example rotor blade 25 are described below.

Propulsion fan rotor 32 drives air through the bypass duct coaxially oriented between the engine core and nacelle 30. Fan rotor (or other propulsion stage) 32 can be directly or indirectly rotationally coupled to low pressure shaft 18. In advanced designs, fan drive gear system 36 couples fan shaft 34 to low spool 12, with respective planetary, ring, and sun gear mechanisms 38, 40 and 42 providing independent fan speed control for reduced noise and improved operating efficiency. In more conventional turbofan designs, fan drive gear system 36 is omitted and fan 32 is driven directly as part of low spool 12. Fan exit guide vanes (FEGVs) 44 are disposed between nacelle 30 and the engine core to reduce swirl and improve thrust performance through the bypass duct. In more compact engine designs, FEGV's may also be structural, providing combined flow turning and load bearing capabilities.

It will be recognized from the remainder of the description that the invention is by not limited to the example two-spool high bypass turbofan engine shown in FIG. 1. By way of further non-limiting examples, fan rotor 32 may additionally or alternatively include an unducted rotor, with turbine engine 10 thereby operating as a turboprop or unducted turbofan engine. Alternatively, fan rotor 32 may be absent, leaving nacelle 30 covering only the engine core, with turbine engine 10 thereby being configured as a turbojet or turboshaft engine. The described subject matter is also readily adaptable to other gas turbine engine components. While the working fluid is described here with respect to a combustion gas turbine, it will be appreciated that the described subject matter can be adapted to engines using other working fluids like steam.

Figure 2:
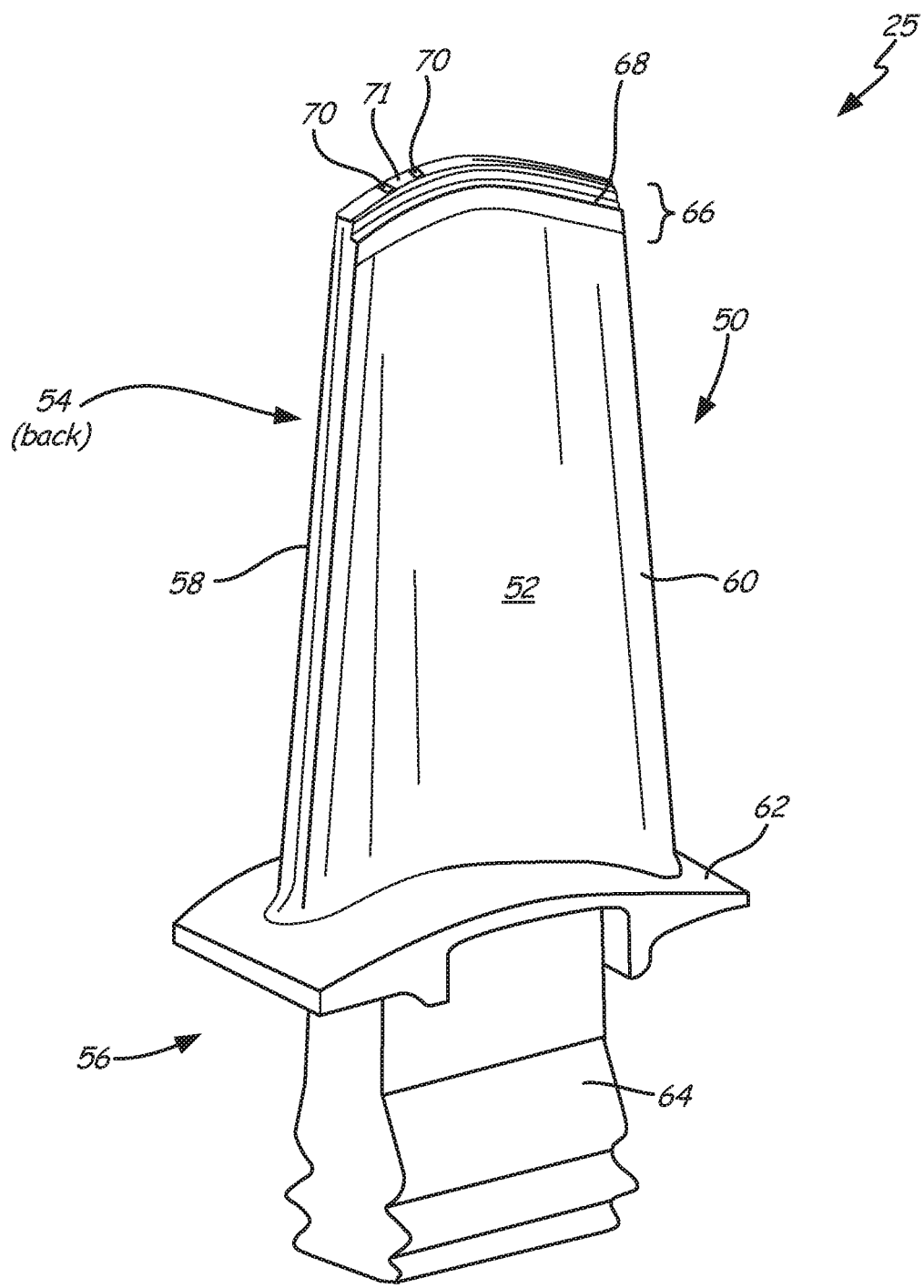
FIG. 2 shows a perspective of an exemplary gas turbine engine rotor blade.

FIG. 2 is a perspective view of turbomachine rotor blade 25, and shows airfoil section 50, pressure sidewall 52, suction sidewall 54, base 56, leading edge 58, trailing edge 60, platform 62, root 64, tip wall 66, tip shelf 68, tip leakage control channels 70, and tip leakage control vane 71.

Rotor blade 25 includes airfoil 50 defined in part by pressure sidewall 52 (front) and suction sidewall 54 (back), each extending spanwise from base 56, and chordwise between leading edge 58 and trailing edge 60. Base 56 can include platform 62 and root 64, which in this example of rotating blade 25, secure airfoil 50 to a rotor disc (not shown). Tip wall 66 extends chordwise from leading edge 58 to trailing edge 60 to join respective outer spanwise ends of pressure sidewall 52 and suction sidewall 54. Airfoil 50 can include one or more tip leakage control elements on or around tip wall 66, such as tip shelf 68, tip leakage control channel(s) 70, and tip leakage control vane(s) 71. While this example is shown as rotor blade 25, airfoil 50 can alternatively define an aerodynamic section of a cantilevered stator vane, with attendant modifications made to the vane base for securing airfoil 50 to an outer circumferential casing.

In operation, pressurized gas flows generally chordwise along both sidewalls 52, 54 from leading edge 58 to trailing edge 60. Airfoil 50 is provided with one or more elements on or around tip wall 66, operating in conjunction with adjacent elements of engine 10 to reduce tip leakage losses. In this general example of blade 50, airfoil 25 includes tip shelf 68 at the junction of pressure sidewall 52 and tip wall 66. It will be recognized that in certain embodiments, tip shelf 68 may be omitted, leaving pressure sidewall 52 continuous up through its junction with tip wall 66. Tip wall 66 can also include at least one tip leakage control channel 70 and/or leakage control vane 71, such as is shown in the example embodiments below. With higher pressure differentials favored along the front-facing pressure sidewall 52, some of the higher pressure gas flowing along suction sidewall 54 tends to leak over tip wall 66. In traditional airfoil designs high pressure gradients from the pressure sidewall to the suction sidewall drives a leakage flow over the tip. This results in lost work extraction as the tangential momentum of the leakage flow is not changed by the airfoil, and higher aerodynamic losses as the leakage flow is reintroduced into the main passage flow. Both of these effects result in reduced efficiency. Tip leakage control channel(s) 70 and tip leakage control vane(s) 71 reduce some of the negative effects of this inevitable leakage flow.

Figure 3A:
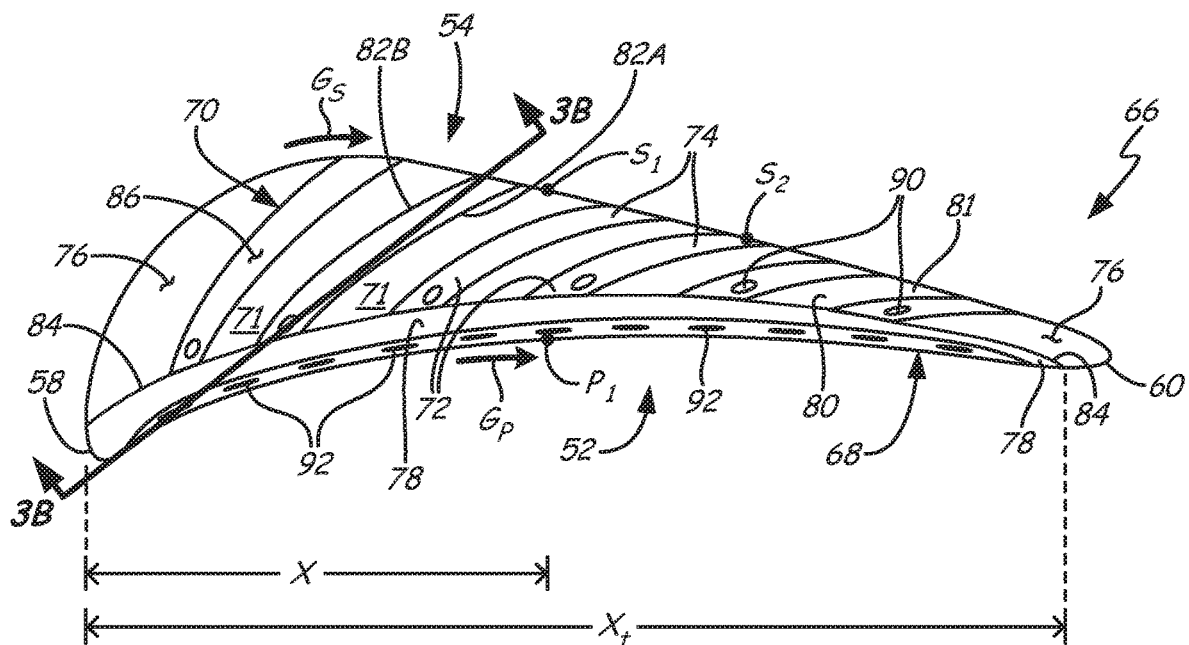
FIG. 3A is a top plan view of the rotor blade shown in FIG. 2.
Figure 3B:
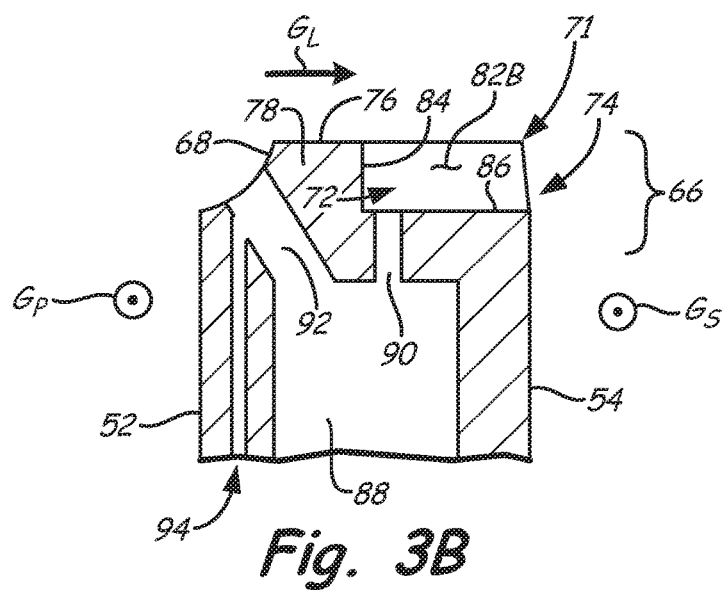
FIG. 3B is a partial cross-section of the rotor blade from FIG. 3A.

FIG. 3A is a top plan view of a first example embodiment of airfoil 50, showing tip wall 66. FIG. 3B is an upstream-facing cross-section taken along line 3B-3B. FIGS. 3A and 3B include pressure sidewall 52, suction sidewall 54, leading edge 58, trailing edge 60, tip wall 66, tip shelf 68, tip leakage control channels 70, tip leakage control vanes 71, control channel inlets 72, control channel outlets 74, tip outer surface 76, tip rib 78, control vane leading portion 80, control vane trailing portion 81, control channel/vane sidewalls 82A, 82B, tip rib suction side 84, control channel floors 86, internal cooling cavity 88, channel cooling apertures 90, tip shelf cooling apertures 92, and airfoil sidewall microcircuit 94.

In this first example embodiment, tip wall 66 includes at least one curved tip leakage control channel 70 and at least one curved tip leakage control vane 71. More than one leakage control channel 70 can be distributed across at least a chordwise portion of tip wall 66 extending between airfoil leading edge 58 and airfoil trailing edge 60. Control channels 70 each include inlet 72 and outlet 74, which may be recessed into or otherwise formed with radially outer surface 76 of tip wall 66. One or more corresponding spanwise tip leakage control vanes 71, can be formed with tip wall outer surface 76 between pairs of adjacent tip leakage control channels 70.

Channel inlets 72, generally disposed proximate the junction of pressure sidewall 52 and tip wall 66. Inlets 72 can be offset widthwise from a junction in order to minimize effective tip clearance, and to block or trip some of the leakage flow $G_L$ across wall 66. The plurality of channel inlets 72 can be aligned along a chordwise path as shown. In certain embodiments, channel inlets are aligned with tip rib 78, which can extend chordwise along at least a portion of the pressure side of tip wall 66 between airfoil leading edge 58 and airfoil trailing edge 60. Tip rib 78 can be provided as part of outer surface 76 to clearance between radially adjacent engine components such as a casing, an air seal, or a rotor land (if configured as part of a stator vane). Control vanes 71 may have a leading portion 80 defined in part by chordwise-adjacent channel inlets 72, and a trailing portion 81 defined in part by chordwise-adjacent channel outlets 74. In this example, channels 70 are defined by sidewalls 82A, 82B, which can also respectively serve as control vane pressure sidewall 82A and control vane suction sidewall 82B. In certain embodiments, control vane leading portion 80 is contiguous with suction side 84 of tip rib 78 to further reduce leakage flow while directing the remainder into and through control channels 70. Control vane trailing portions 81 may be contiguous with suction sidewall 52 between channel outlets 74 terminating at a recessed portion of the junction of suction sidewall 52 and tip wall 66.

In this example, channel 70 has a box shaped cross-section, where adjacent channel sidewalls 82A, 82B extend substantially perpendicular to flat channel floor 86. In this example, vanes 71 extend spanwise from adjacent control channel floors 86 recessed into tip wall 66 from outer surface 76. In alternative embodiments, such as those shown in FIGS. 6A and 6B, one or more vanes may extend spanwise from a lowered tip floor outer surface extending generally from airfoil leading edge 58 to trailing edge 60. It will be appreciated that one or more channels 70 can additionally or alternatively have different cross-sections, and those cross-sections can vary between inlet 72 and outlet 74. By way of one non-limiting example, one or more channels 70 can have a continuously curved sidewall to form a u-shaped cross-section. By way of other non-limiting examples, one or more channels 70 can have angled floors or sidewalls. In yet other examples, channel floor 86 can be omitted to form an upright v-shaped cross-section. Other irregular cross-sections are also possible for tailoring channels 70 and/or vanes 71 to different tip leakage profiles.

In certain embodiments, airfoil 50 is an internally cooled turbine blade, and includes at least one internal cooling cavity 88. Cooling cavity 88 can be formed during investment casting of airfoil 50 using one or more shaped casting cores. The cores may be made from ceramics, refractory metals, or a combination thereof. An example of a combined ceramic and refractory metal casting core is described in commonly assigned U.S. Pat. No. 6,637,500 by Shah et al., which is herein incorporated by reference in its entirety. Other casting core technology may also be implemented.

One or more leakage control channels 70 can include at least one cooling aperture 90 in fluid communication with internal cavity 88 for cooling control channel 70. While shown as a single round through hole drilled or cast into channel floor 86 proximate channel inlet 72, aperture 90 may be one or more apertures 90, at least some of which can have an alternative form or position tailored to the relative pressure profile over tip wall 66. Aperture 90 may, for example, additionally or alternatively discharge coolant into channel 70 from tip rib suction side 84, and/or channel sidewalls 82A, 82B. Tip shelf 68 can also additionally or alternatively include at least one pressure side cooling aperture 92 to direct coolant along the junction of pressure sidewall 52 and tip wall 66. Apertures 92 thus may be diffusion holes or slots to create an effective wall of coolant along tip shelf 68 for impeding tip leakage. Apertures 92 can be in fluid communication with cooling cavity 88, which may be the same cavity 88 feeding apertures 90, or it may be a separate cooling cavity. In certain embodiments, pressure sidewall 52 and suction sidewall 54 can include one or more microcircuit cooling cavities 94 formed separate from or contiguous with internal cooling cavity 88. Microcircuit(s) 94, which may be formed in pressure sidewall 52 and/or suction sidewall 54 using at least one refractory metal casting core, can optionally be in fluid communication with apertures 92 or can alternatively feed coolant to dedicated apertures.

Figure 3C:
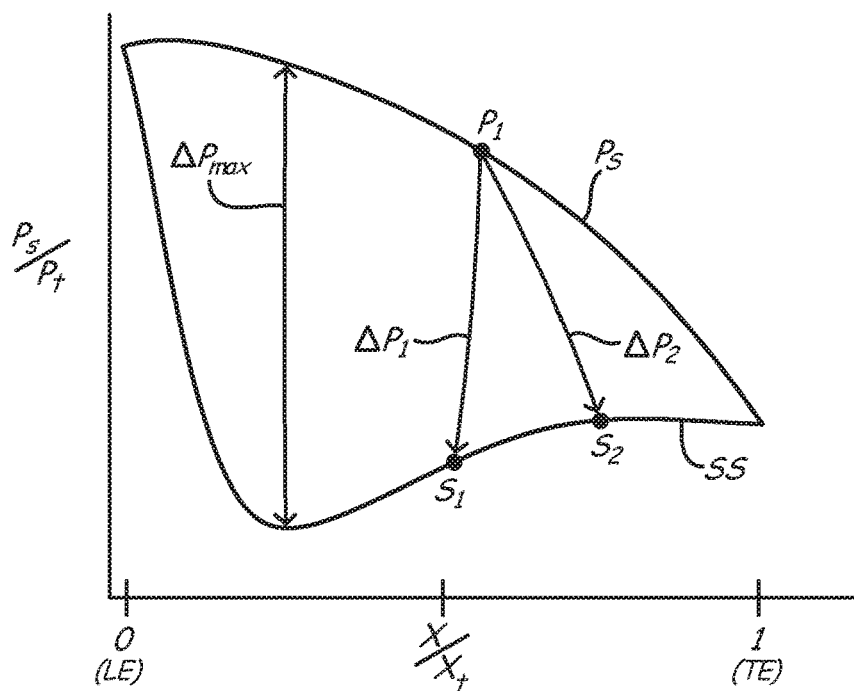
FIG. 3C is a graph showing relative pressures on opposing rotor blade surfaces.

FIG. 3C is a graph of relative pressures around tip wall 66. FIG. 3C graphically shows the pressure relationship across tip wall 66 with vertical plotting of pressure ratio $P_s/P_t$ at relative chordwise positions $x/x_t$. $P_s$ is the localized static pressure and $P_t$ is the localized total pressure. For simplicity, the scale $x/x_t$ is measured linearly along chordwise tip rib suction side 84, which also doubles in this example as an upstream wall of each channel inlet 72. Other relative scales may be used giving slightly different relative pressure readings, but the relative pressure profiles will be substantially consistent across these different scales.

As is expected, pressure side (PS) and suction side (SS) readings of $P_s/P_t$ are equal when $x/x_t$ is at point 0, corresponding to leading edge 58. The pressure differential ΔP increases then decreases chordwise until being equal again when $x/x_t$ reaches point 1, corresponding to trailing edge 60. The exact pressure relationship along tip wall 66 will depend on operating conditions, sweep of the airfoil, relative curvatures of pressure sidewall 52 and suction sidewall 54, among other factors. It can be seen that in the example turbine airfoil 50, there is a fairly large ΔP range around the midchord region of the tip. Around midchord, the PS pressure has not yet fallen off, while the SS pressure drops to a minimum before recovering close to trailing edge 60. Here, the maximum pressure differential $ΔP_{max}$ between pressure side flow $G_P$ and suction side flow $G_S$ occurs just forward of midchord.

As seen in FIG. 3A, tip wall 66 includes tip leakage control channels 70 and control vanes 71 at various relative chordwise positions $x/x_t$. To illustrate operation of one such channel 70 disposed roughly midchord along tip wall 66, FIG. 3C shows approximations of the relative pressure differentials $ΔP_1$ and $ΔP_2$, comparing leakage flow paths in a conventional blade tip versus a blade tip having at least one channel 70. With a conventional tip, leakage flow $G_L$ originating around point $P_1$ of pressure sidewall 52 will take the shortest path over the tip wall toward point $S_1$ roughly perpendicular to pressure sidewall 52 at that point. Leakage flow $G_L$ thus collides roughly perpendicular with suction flow $G_S$ around point $S_1$. Since airfoil 50 is in relative rotational motion along with gas flows $G_P$ and $G_S$, and because pressure side gas flow $G_P$ is necessarily slower than $G_S$, leakage flow $G_L$ between points $P_1$ and $S_1$ has virtually zero relative chordwise momentum, and high circumferential momentum, compared to substantial chordwise momentum of suction flow $G_S$.

In contrast, tip leakage control channel 70 captures a localized portion of leakage flow $G_L$ at inlet 72, and redirects it through a curved portion of channel 70 toward airfoil trailing edge 60. The redirected flow is ejected from the channel, entering the suction side gas stream proximate point $S_2$, downstream of the normal point of entry $S_1$. Since channel 70 can be recessed below the outermost surface of tip wall 66, the flow enters the suction side gas stream below the junction of surface 76 and suction sidewall 54. In this example, $P_s/P_t$ is actually greater at point $S_2$ than at point $S_1$, reducing the magnitude of leakage based on a smaller pressure differential $ΔP_2$. By redirecting the entry point of leakage flow $G_L$ downstream toward point $S_2$, channel 70 (and control vane 71) also imparts/converts a portion of the momentum into an increased chordwise component, which necessarily reduces the conflicting widthwise momentum component of the leakage flow perpendicular to suction side flow $G_S$. This has two positive effects on the gas flows.

Redirecting leakage momentum downstream from point $S_1$ allows leakage flow $G_L$ to more quickly integrate into $G_S$, closer to suction sidewall 54. Decreasing widthwise momentum and/or increasing the tangential momentum of leakage flow $G_L$ entering suction side flow $G_S$ reduces conflict and turbulence at the entry point(s) by permitting less penetration of leakage flow $G_L$ to into the main flow path of suction gas flow $G_S$. With a larger chordwise (tangential) momentum component aligned with flow $G_S$, there also ends up being less boundary flow disturbance of suction gas flow $G_S$, reducing flow separation around tip wall 66. All of these increase efficiency by reducing the size and strength of resulting tip leakage vortices as shown in FIGS. 4A and 4B.

Figure 4A:
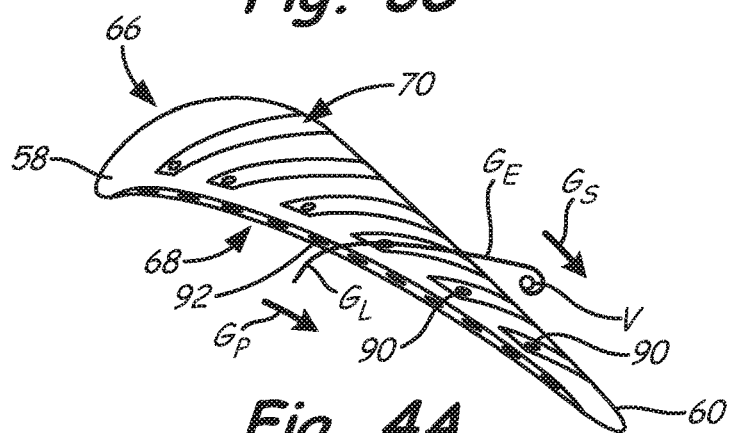
FIG. 4A depicts a vortex caused by leakage over the tip of the rotor blade.
Figure 4B:
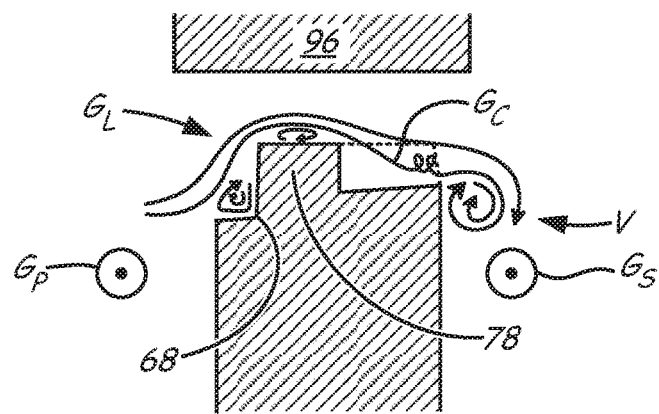
FIG. 4B shows a second view of the vortex caused by leakage between the tip and an adjacent seal surface.

FIG. 4A shows tip leakage vortices exiting channel 70 and being integrated into suction gas flow $G_S$, and includes pressure sidewall 52, suction sidewall 54, airfoil leading edge 58, airfoil trailing edge 60, tip wall 66, tip shelf 68, and tip leakage control channels 70, and control channel cooling apertures 90. FIG. 4B is a cross-section of tip wall 66 taken through channel 70 with air seal 96 radially adjacent tip wall 64 to minimize clearance at tip wall 66. Optional internal details of the blade and air seal 96, such as cavities and cooling apertures have been omitted for clarity and to better illustrate the effects of leakage control cavity 70.

Air seal 96 cooperates with tip wall 66 to minimize clearance, and overall tip leakage therebetween. Air seal 96 can be any conventional or inventive blade outer air seal (BOAS) compatible with an unshrouded rotor blade. Air seal 96 may optionally include a sacrificial layer to reduce rubbing damage to tip rib 78, or more generally to tip wall 66, during maximum centrifugal and thermal expansion of airfoil 50 relative to the surrounding casing (not shown) onto which air seal 96 is mounted.

As explained above with respect to FIG. 3C, large pressure differentials across tip wall 66 result in leakage flow $G_L$ passing over tip shelf 68 and tip rib 78 with substantial initial widthwise momentum. Channels 70 and vanes 71 help capture a portion of that flow, and redirect it downstream as it passes over tip wall 66, providing channel flow $G_C$ with increased chordwise momentum compared to other leakage flow $G_L$. The portion of leakage flow $G_L$ flowing through channel 70 joins with suction gas flow $G_S$ at a higher pressure downstream location. Entry flow $G_E$ results in vortex V when joining suction gas flow $G_S$. However, position of vortex V is smaller and closer to suction sidewall 54 than it would be absent leakage control channels 70 and vanes 71. The magnitude of vortex V can also be reduced due to addition of chordwise momentum to entry flow $G_E$ from channels 70 and vanes 71.

Figure 5A:
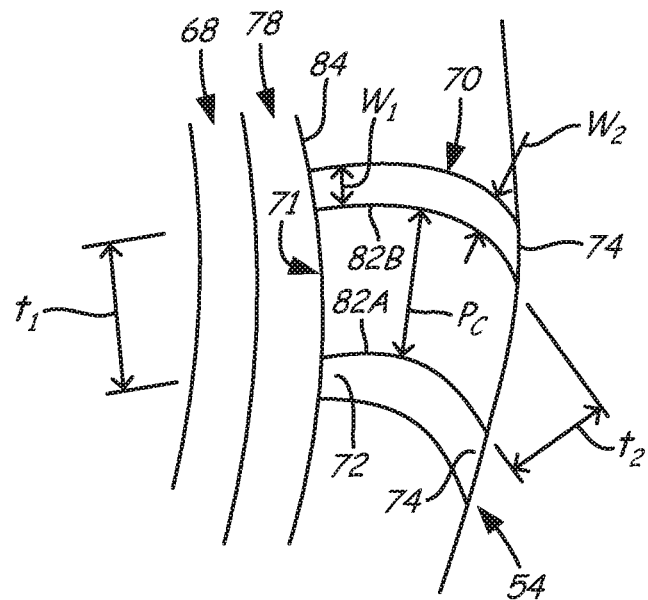
FIG. 5A is a magnified view of tip leakage control channels and vanes.

FIG. 5A shows two adjacent tip leakage control channels 70 bounding an intermediate tip leakage control vane 71, and also includes pressure sidewall 52, suction sidewall 54, tip wall 66, tip shelf 68, tip leakage control channels 70, tip leakage control vanes 71, control channel inlets 72, control channel outlets 74, tip outer surface 76, tip rib 78, vane leading portion 80, vane trailing portion 81, control channel/vane sidewalls 82A, 82B, tip rib suction side 84, and control channel floors 86. Channel cooling apertures 90 and tip shelf cooling apertures 92 have been omitted for clarity.

As seen here, channel inlets 72 have first chordwise width $W_1$ proximate channel inlet 72, and outlets have second chordwise width $W_2$ proximate channel outlet 74. In certain embodiments, second chordwise width $W_2$ proximate outlet 74 is equal to or less than first chordwise width $W_1$. In alternative embodiments, second width $W_2$ is greater than first width $W_1$. Similarly control vane 71 includes leading chordwise thickness $t_1$ proximate tip rib 78, and trailing chordwise thickness $t_2$ proximate suction sidewall 54. In certain embodiments, trailing chordwise thickness $t_2$ is equal to or less than leading chordwise width $t_1$. In alternative embodiments, thickness $t_1$ is greater than thickness $t_2$. Adjacent channels 70 can be separated by pitch $P_c$, which is an average distance between the sidewalls 82A, 82B of adjacent channels 70. $P_c$ is shown as average separation because the inlet and outlet widths $W_1$, $W_2$ of individual channels 70 may vary in the same channel 70 as well as between adjacent channels. In certain embodiments $P_c$ is constant across at least a chordwise portion of tip wall 66. Pitch $P_c$ may vary elsewhere along tip wall 66 based on relative curvatures of channels 70 and vanes 71, described below in FIG. 5B.

Figure 5B:
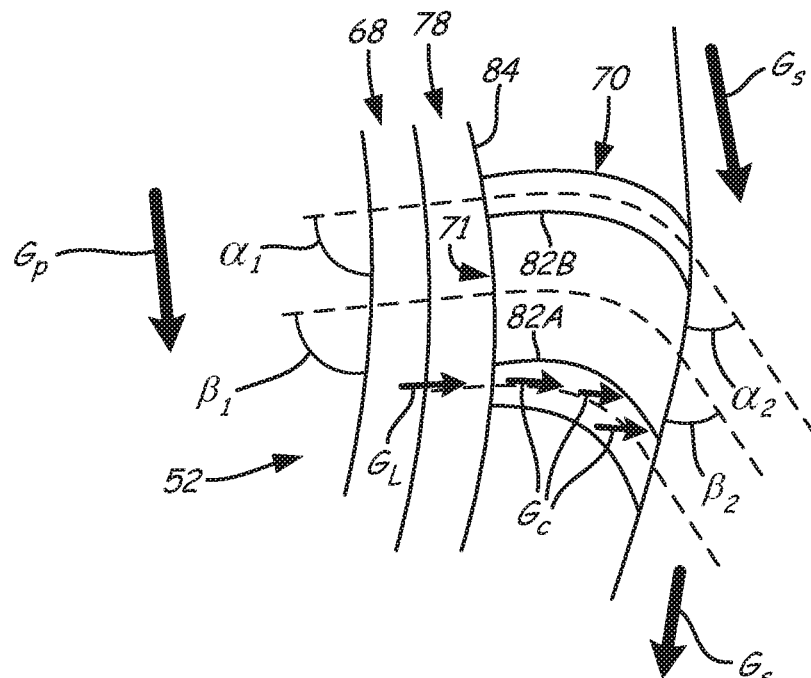
FIG. 5B shows angles of tip leakage control channels and vanes from FIG. 5A.

FIG. 5B shows the relative angles of channels 70 and vanes 71 shown in FIG. 5A. Channel inlet 72 forms channel entrance interior angle $\alpha_1$ relative to pressure sidewall 52. Channel outlet 74 forms channel exit interior angle $\alpha_2$ relative to suction sidewall 54. In certain embodiments, angle $\alpha_2$ is less than or equal to $\alpha_1$. The effective curvature radius of channel 70 is thus the same or greater than the local curvature radius of tip wall 66.

In certain of those embodiments, channel entrance angle $\alpha_1$ is between about 80° and about 95°. Channel entrance angle $\alpha_1$ may be greater than 90° when leakage flow $G_L$ cascading over the upper region of pressure sidewall 52 is expected to have a substantial chordwise flow component relative to the motion of airfoil 50 at the leakage point. When leakage flow $G_L$ is expected to have substantially zero chordwise momentum around the leakage point, channel entrance angle $\alpha_1$ may be less than or equal to about 90°. This may occur, for example, as a result of tip shelf 68 (and shelf cooling apertures 92) reducing net leakage flow $G_L$.

Flow out of channel cooling apertures 90 (not shown in FIG. 5B) may also impart a counteracting momentum component to channel flow $G_C$ once leakage flow $G_L$ has entered inlet 72. In certain embodiments, channel exit angle $\alpha_2$ can be less than about 90° which can impart additional chordwise momentum to channel flow $G_C$ exiting outlet 74. Similarly, control vane leading portion 80 forms leading interior angle $\beta_1$ relative to pressure sidewall 52, and control vane trailing portion 81 forms trailing interior angle $\beta_2$ relative to suction sidewall 54. Angles $\beta_1$ and $\beta_2$ are measured around the respective chordwise midpoint of vane leading and trailing portions 80, 81. In certain embodiments, angle $\beta_2$ is less than or equal to $\beta_1$.

FIG. 5B also illustrates another effect of tip leakage control channels 70 and vanes 71. Since tip leakage flow typically enters channel 70 approximate perpendicular to the local junction with pressure sidewall 52, channel gas flow will tangentially strike sidewall 82A before being redirected. This can cause initial flow turbulence directly above channel inlet 72, which introduces tip vortices into the clearance gap between tip wall 66 and air seal 96 (shown in FIG. 4B), blocking a portion of additional leakage flow $G_L$ over tip wall 66. These clearance vortices can be further enhanced by coolant flow directed outward from channel cooling apertures 92. In addition, tangential contact of channel flow $G_C$ with channel/vane sidewall 82A imparts a measure of thrust onto vane 71, allowing some work to be recovered from leakage flow.

Figure 5C:
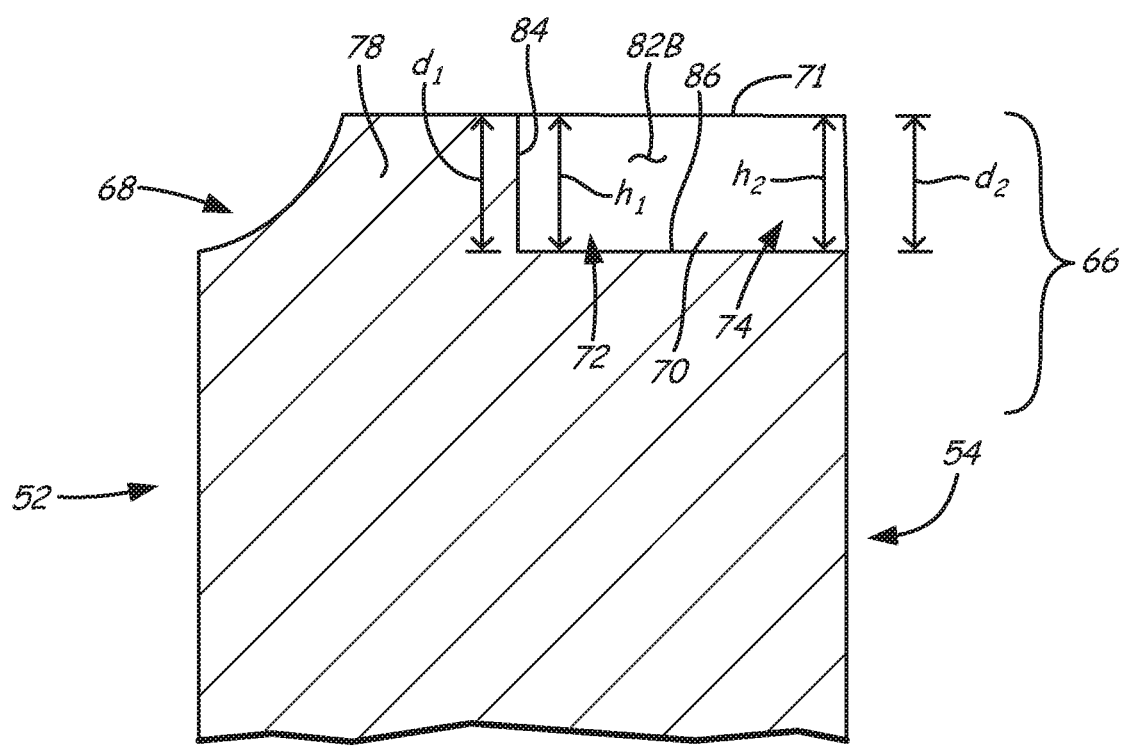
FIG. 5C shows additional features to the tip leakage control channels and vanes of FIG. 5A.

FIG. 5C is a side view of airfoil 50 with pressure sidewall 52, suction sidewall 54, tip wall 66, tip shelf 68, tip leakage control channel 70, tip leakage control vane 71, leakage control channel inlet 72, leakage control channel outlet 74, tip rib 78, leakage control vane leading portion 80, leakage control vane trailing portion 81, leakage control vane sidewall 82B, tip rib suction side wall 84, and leakage control channel floor 86.

FIG. 5C shows the radial dimensions of leakage control channel and vane 70, 71. As in FIG. 4B, internal details of the blade such as cavities and cooling apertures have been omitted to show the remaining reference dimensions of leakage control channel 70 and vane 71. It can be seen here that leakage control channel 70 can have first depth $d_1$ measured for example proximate inlet 72 and second depth $d_2$ proximate outlet 74. The depths are generally the respective distances that channel floor 86 is recessed relative to an upper portion of tip wall 66. This upper portion may be the top of tip rib 78 and/or control vane 71, but in certain embodiments, first and second depths $d_1$, $d_2$ may be measured from different upper surface.

Similarly, a first height $h_1$ of leakage control vane 71 is measured around its leading portion 80, and a second height $h_2$ is measured around the trailing portion 81. These heights $h_1$ and $h_2$ are typically determined relative to channel floor 86. In certain embodiments, however, heights $h_1$ and $h_2$ can be determined relative to tip floor 76.

Depending on pressure differentials along a particular airfoil 50 (e.g., as shown in FIG. 3C), dimensions, separation, and curvature of channels 70 and vanes 71 may be adapted to optimize redirection of leakage flow while still maintaining adequate tip cooling and material strength. Dimensions of channels 70 and vanes 71 will also affect the practical dimensions and angles that can be achieved. These relative dimensions and pitches can be adapted optimize performance based on expected or modeled pressure differentials at different locations around tip wall 66. Relative curvatures can be defined first with dimensions resulting therefrom, or relative dimensions may be defined with resulting curvatures. The overall configuration of tip wall 66 can also be determined iteratively based on one or more constraints of the various widths, thicknesses, pitches, and angles.

For example, in locations where leakage is most likely, such as proximate midchord where pressure side pressures are highest, channels 70 may have a wider inlet $W_1$. They can also be provided with a narrower outlet width $W_2$ relative to $W_1$, which can increase the pressure and exit velocity of leakage flow $G_L$ entering the suction gas stream $G_S$. In other embodiments, at locations with lower relative suction side pressures, $W_2$ may be the same as or even greater than $W_1$ in order to more closely match the entry pressure and velocity. Further, the relative and absolute pressures, along with available tip wall surface area, will also determine the pitch $P_c$ of channels 70. As before, the midchord region of tip wall 66 may have smaller pitch values $P_c$. It will be recognized that widths $W_1$ will generally vary inversely with thickness $t_1$ and vice versa. Similarly, widths $W_2$ generally vary inversely with thickness $t_2$ and vice versa. As also explained below, channel floor 86 may be sloped such that $d_2$ is less than $d_1$.

Figure 6A:
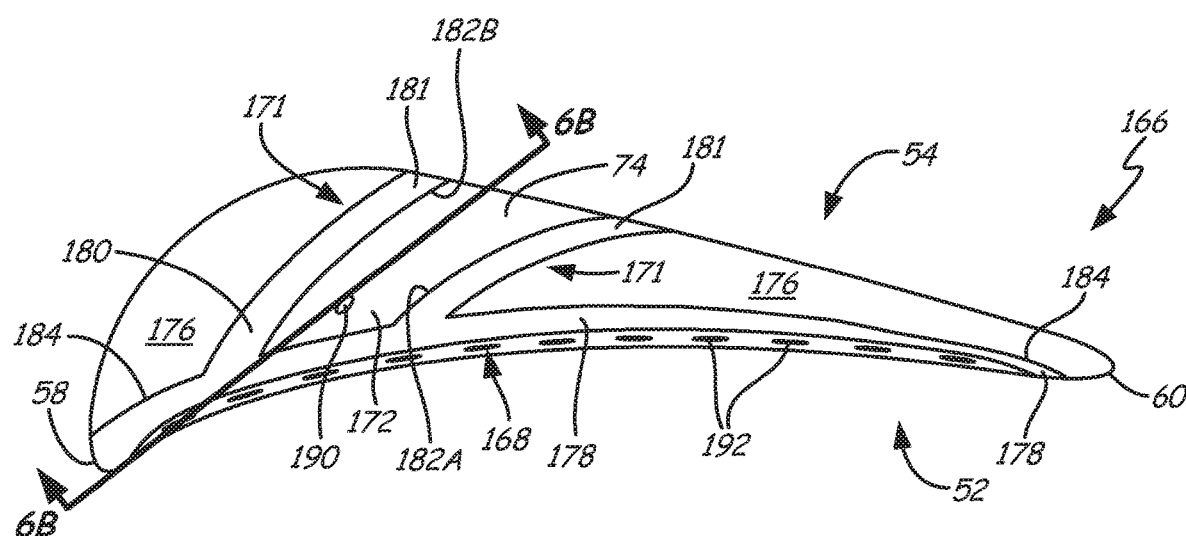
FIG. 6A is a top plan view of a first alternative rotor blade tip wall configuration.
Figure 6B:
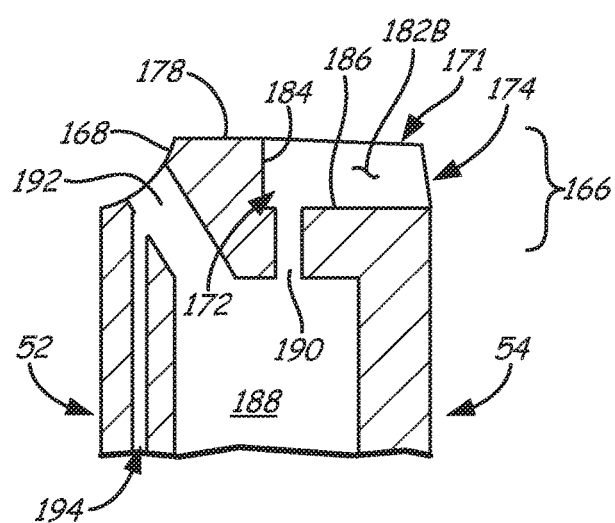
FIG. 6B is a partial cross-section of the alternative rotor blade tip wall configuration shown in FIG. 6A.

FIG. 6A shows tip wall 166, which also includes pressure sidewall 52, suction sidewall 54, airfoil leading edge 58, airfoil trailing edge 60, tip shelf 168, tip leakage control channel 170, tip leakage control vanes 171, control channel inlet 172, control channel outlets 174, tip floor 176, tip rib 178, control vane leading portions 180, control vane trailing portions 181, control channel/vane sidewalls 182A, 182B, tip rib suction side 184, control channel floor 186, channel cooling aperture 190, tip shelf cooling apertures 192, and airfoil sidewall microcircuit 194. FIG. 6B is a cross-section taken across line 6B-6B of FIG. 6A.

Tip wall 166 is a first alternative embodiment of tip wall 66 described above. Similar to FIG. 2, pressure sidewall 52 and sidewall 54 each extend spanwise from airfoil base 56 between leading edge 58 and trailing edge 60. Airfoil 50 also includes tip wall 166 extending chordwise from leading edge 58 to trailing edge 60. In this first example alternative embodiment, at least one curved tip leakage control vane 171 projects radially outward in a spanwise direction from tip wall 166. Control vanes 171 each include leading vane portion 180 and trailing portion 181 between adjacent sidewalls 182A, 182B. Control vane leading portion 180 begins proximate a junction of airfoil pressure sidewall 52 and tip wall 166. Control vane trailing portion 181 terminates proximate a junction of airfoil suction sidewall 54 and tip wall 166.

In this first alternative embodiment, rather than having channels recessed into a tip floor as shown in FIGS. 3A and 3B, vanes 171 extend radially outward from a lower tip floor 176 extending at least partway between airfoil leading edge 58 and trailing edge 60. More than one leakage control vane 171 can be distributed chordwise across at least a portion of tip floor 176. A corresponding curved tip leakage control channel 170 can be defined at least in part by adjacent ones of the plurality of tip leakage control vanes 171. As above, channel inlet 172 can be defined by adjacent control vane leading portions 180, and channel outlet 174 can be defined by adjacent control vane trailing portions 181.

Tip rib 178 can also project spanwise from at least a chordwise portion of tip wall 166. In certain embodiments, tip rib 178 can extend at least partway between airfoil leading edge 58 and airfoil trailing edge 60 along pressure side of tip wall 166, outward from tip floor 176. In certain embodiments, such as is shown in FIG. 6A, of the control vane leading portion 196 can be contiguous with tip rib suction side surface 184. Tip shelf 168 with cooling apertures 192 (in fluid communication with internal cooling cavity 188 and/or microcircuits 194) can be recessed into a pressure side surface of tip rib 178. Alternatively, the pressure side surface of tip rib 178 can be an extension of pressure sidewall 52.

Similar to the illustrations shown in FIGS. 5A and 5B, control vane 171 can have leading portion 180 forming leading interior angle $\beta_1$ relative to pressure sidewall 52, and vane trailing portion forming interior angle 132 relative to suction sidewall 54. In certain embodiments, angle $\beta_2$ can be less than or equal to $\beta_1$, which increases the chordwise component of leakage flow to reduce vortices and enhances work recovery from the captured leakage flow as described above with respect to FIGS. 5A and 5B.

Figure 7A:
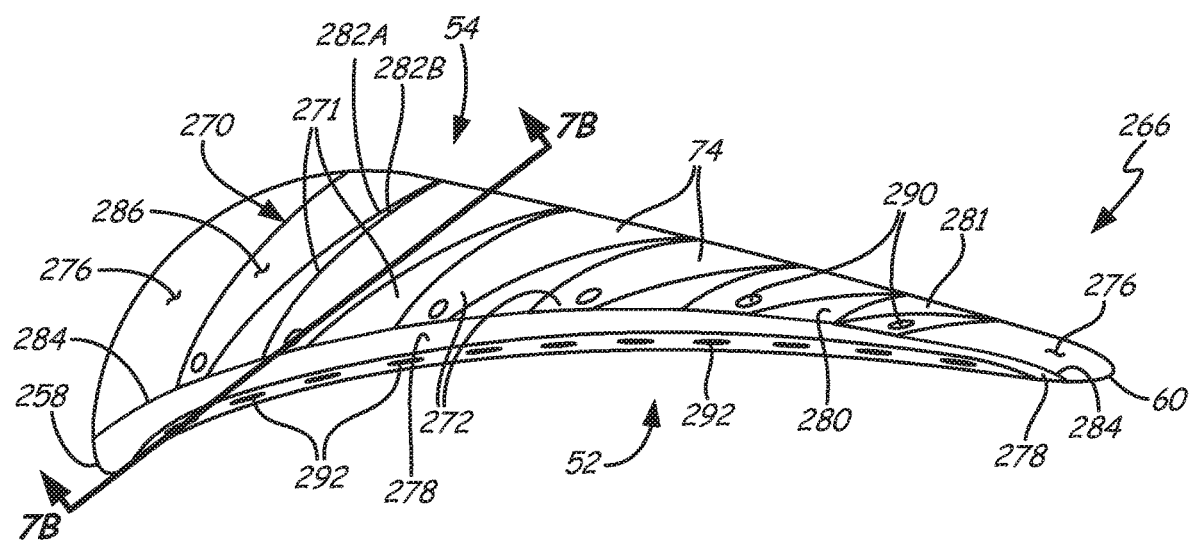
FIG. 7A is a top plan view of a second alternative tip wall configuration.

FIG. 7A shows tip wall 266, which also includes pressure sidewall 52, suction sidewall 54, airfoil leading edge 58, airfoil trailing edge 60, tip shelf 268, ramped tip leakage control channel 270, tip leakage control vanes 271, control channel inlets 272, control channel outlets 274, tip floor 276, tip rib 278, control vane leading portions 280, control vane trailing portions 281, control channel/vane sidewalls 282A, 282B, tip rib suction side 284, ramped control channel floor 286, channel cooling aperture 290, tip shelf cooling apertures 292, and airfoil sidewall microcircuit 294. FIG. 6B is a cross-section taken across line 6B-6B of FIG. 6A.

Tip wall 266 is a second alternative embodiment of tip wall 66 described above. Similar to FIG. 2, pressure sidewall 52 and sidewall 54 each extend spanwise from airfoil base 56 between leading edge 58 and trailing edge 60. Airfoil 50 also includes tip wall 266 extending chordwise from leading edge 58 to trailing edge 60. In this second example alternative embodiment, tip shelf 266 includes at least one curved and ramped tip leakage control channel 270.

In this second example alternative embodiment, leakage control channel floor 286 is ramped upward, in contrast to the substantially flat channel floor 86 shown in FIGS. 3A and 3B. Thus, control channel 270 is shallower at the suction side exit than at the pressure side inlet. As a result, leakage flow $G_L$ is provided with increased pressure and exit velocity is decreased, allowing for more uniform leakage flow entering suction gas stream $G_S$.

Figure 7B:
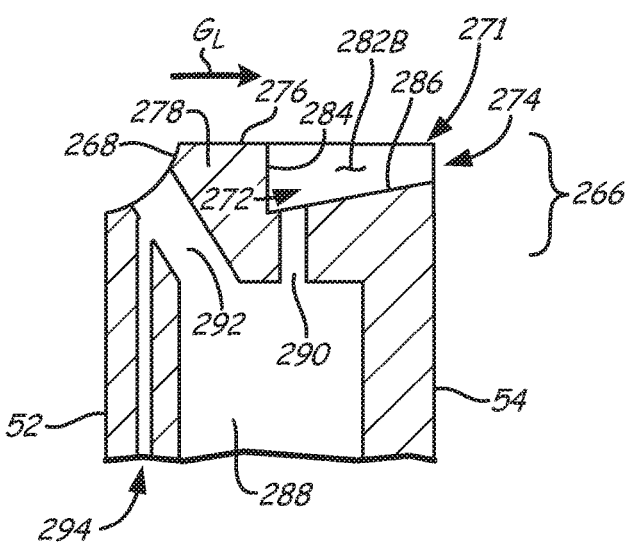
FIG. 7B is a partial cross-section of the alternative tip wall configuration shown in FIG. 7A.

Leakage flow can be further controlled by widening control channel outlets 274. As was shown in FIGS. 5A and 5B, leakage control channels have an inlet width $W_1$ that may be the same as or differ from outlet width $W_2$. In certain embodiments, including but not limited to the second alternative example embodiment of FIGS. 7A and 7B, outlet width $W_2$ is greater than inlet width $W_1$ so as to further improve uniformity of the leakage flow entering suction gas stream $G_S$. In certain of those embodiments, outlet width $W_2$ is approximately equal to the pitch $P_C$ between adjacent control channels (see FIG. 5A). In such embodiments, as outlet width $W_2$ approaches the local channel pitch $P_C$, the trailing chordwise thickness $t_2$ of adjacent leakage control vanes 271 will be less than leading control vane thickness $t_1$ and will approach zero at the junction of suction sidewall 54 and tip wall 266. These shapes also contribute to reduced flow separation and tip vortices adjacent leakage control vanes 271.

Figure 8A:
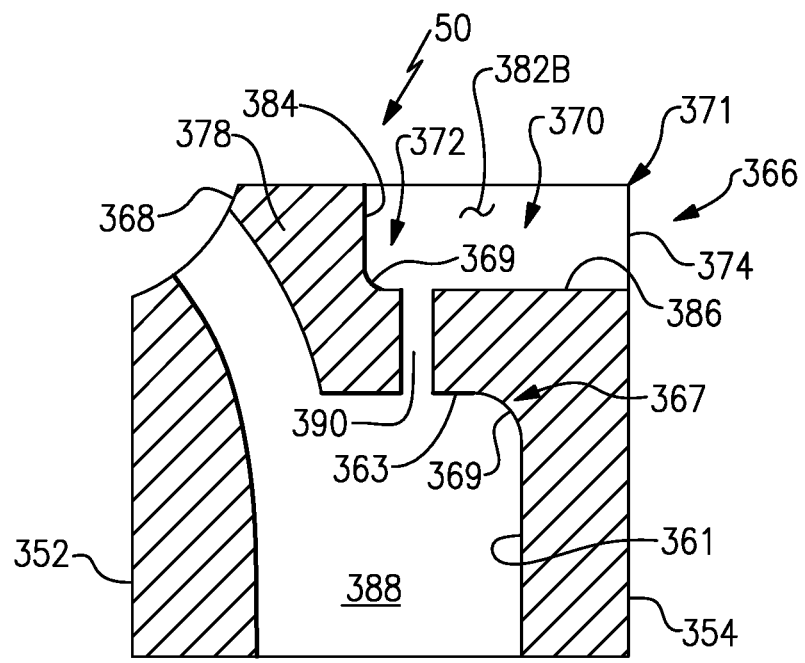
FIGS. 8A and 8B illustrate another tip wall configuration.
Figure 8B:
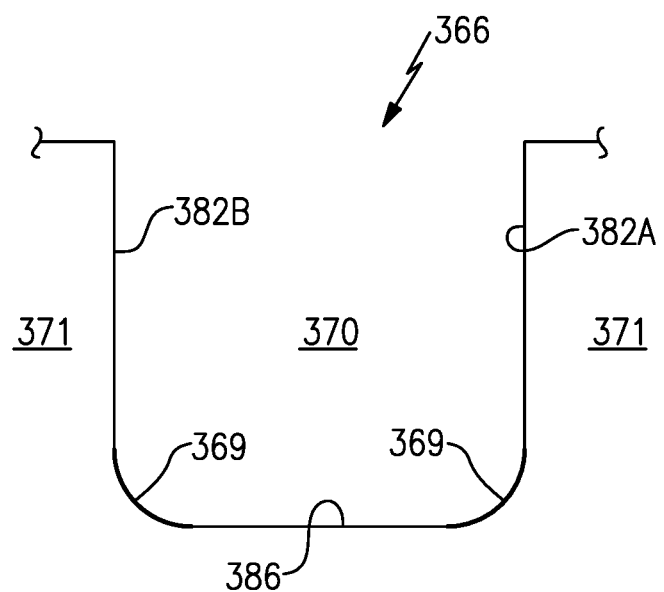

FIGS. 8A and 8B illustrate a tip wall 366 of an airfoil 50. The tip wall 366 is another alternative embodiment of the tip wall 66 described above.

The tip wall 366 includes a pressure sidewall 352, a suction sidewall 354, a tip shelf 368, a tip leakage control channel 370 and a tip leakage control vane 371. The tip leakage control channel 370 includes an inlet 372, an outlet 374, and a control channel floor 386. A tip rib 378 includes a tip rib suction side 384 that establishes an endwall near the inlet 372 of the tip leakage control channel 370. The control channel floor 386 of the tip leakage control channel 370 extends axially between tip leakage control vane sidewalls 382A, 382B (only sidewall 382B shown in FIG. 8A).

In this embodiment, a plurality of radiused walls 369 are formed on the inner diameter corners of each tip leakage control vane 371. For example, a radiused wall 369 may connect the tip rib suction side 384 to the control channel floor 386 of the tip leakage control channel 370. The vane sidewalls 382A and 382B may also be connected to the control channel floor 386 via radiused walls 369 (best shown in FIG. 8B).

Among other benefits, the radiused walls 369 provide smooth surfaces for airflow to flow across as the airflow circulates through the tip leakage control channels 370. The radiused walls 369 may additionally reduce the potential for cracking at sharp corners of the tip wall 366.

The radiused walls 369 may include any radius. The radius may depend on design specific parameters, including but not limited to the cooling requirements of the airfoil 50.

Other portions of the airfoil 50 may additionally or alternatively include radiused walls 369. For example, as best shown in FIG. 8A, a corner 367 defined between a sidewall 361 and an endwall 363 of a cooling cavity 388 formed inside the airfoil 50 may include a radiused wall 369. This positioning of the radiused wall 369 may enable improved flow of airflow into a channel cooling aperture 390 that feeds the tip leakage control channel 370 from the cooling cavity 388.

The locations of the radiused walls 369 shown in FIGS. 8A and 8B are intended as non-limiting. It should be appreciated that other locations of the tip wall 366 could benefit from radiused walls 369. In addition, the use of radiused walls 369 may be combined with any other feature described in this disclosure without departing from the scope of the disclosure.

Figure 9A:
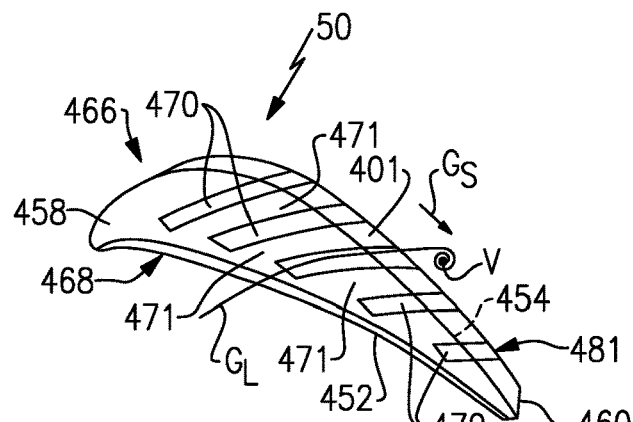
FIGS. 9A, 9B and 9C illustrate yet another tip wall configuration.
Figure 9B:
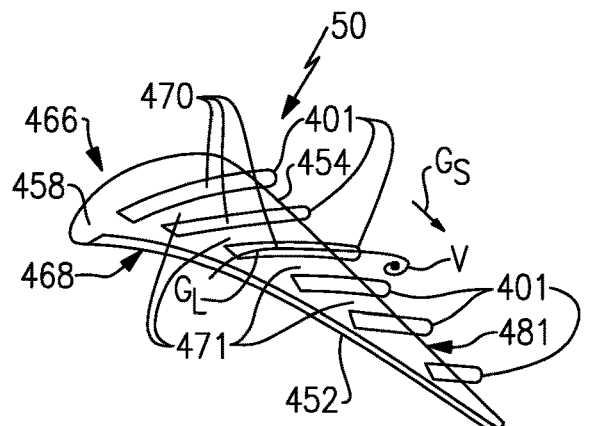
Figure 9C:
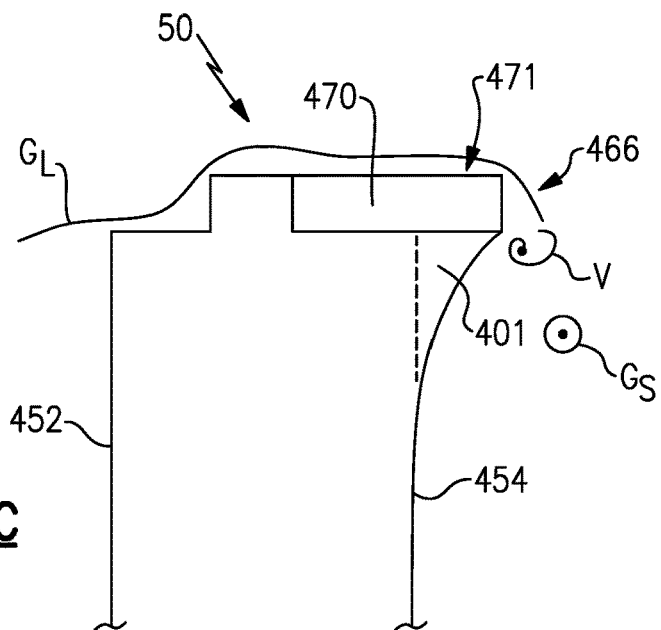

FIGS. 9A, 9B and 9C illustrate yet another embodiment of a tip wall 466 of an airfoil 50. The airfoil 50 includes a pressure sidewall 452, a suction sidewall 454, an airfoil leading edge 458, an airfoil trailing edge 460, a tip wall 466, a tip shelf 468, and tip leakage control channels 470 dispersed between tip leakage control vanes 471. In one embodiment, the tip leakage control channels 470 and tip leakage control vanes 471 are curved.

In this embodiment, the tip wall 466 includes a winglet 401 that extends from the suction sidewall 454 of the airfoil 50. In one non-limiting embodiment, the winglet 401 is formed at a junction between the suction sidewall 454 and the tip leakage control vane 471. The winglets 401 can reduce the inducement of a vortex V that is results from a leakage flow $G_L$ joining suction gas flow $G_S$ near the suction sidewall 454.

In a first embodiment, the winglet 401 may span the entire distance between the leading edge 458 and the trailing edge 460 of the airfoil 50 (see FIG. 9A). The winglet 401 is located adjacent to the suction sidewall 454, in one embodiment.

In an alternative embodiment, each tip leakage control vane 471 includes a winglet 401 (see FIG. 9B). Each winglet 401 represents a discrete portion of the tip wall 466 that extends from each tip leakage control vane 471. In other words, the winglets 401 may be localized features of each tip leakage control vane 471. The winglets 401 may be formed on the control vane trailing portions 481 of the tip leakage control vanes 471.

The winglets(s) 401 may be used either alone or in combination with any other tip wall feature described in this disclosure. By way of one non-limiting example, the winglet 401 could be used in combination with the tip wall 366 described above that includes one or more radiused walls 369.

Figure 10A:
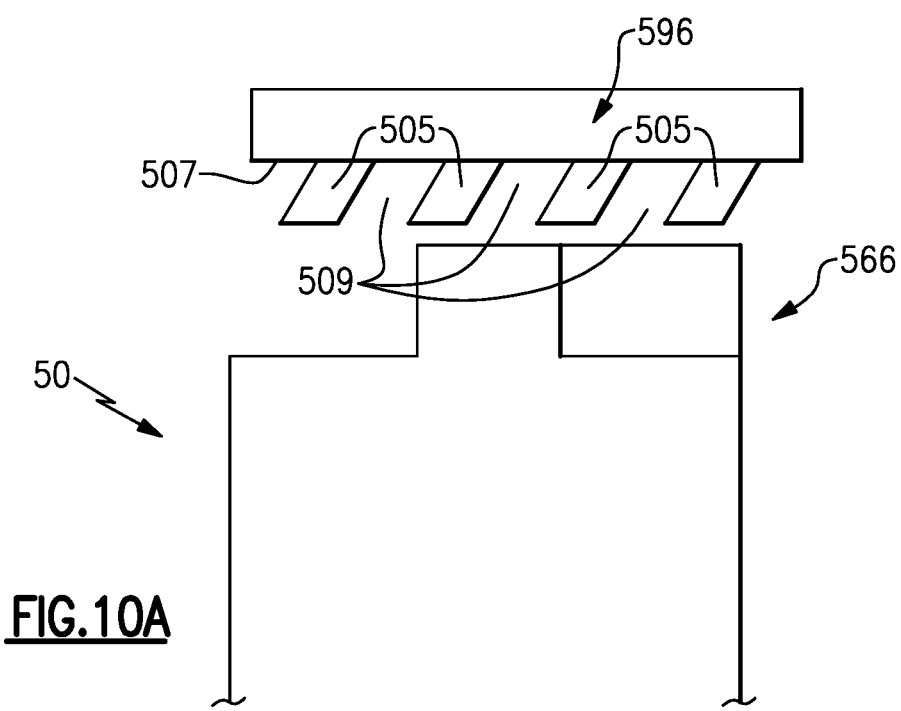
FIGS. 10A and 10B illustrate a vortex caused by leakage between a tip wall and an adjacent seal surface.
Figure 10B:
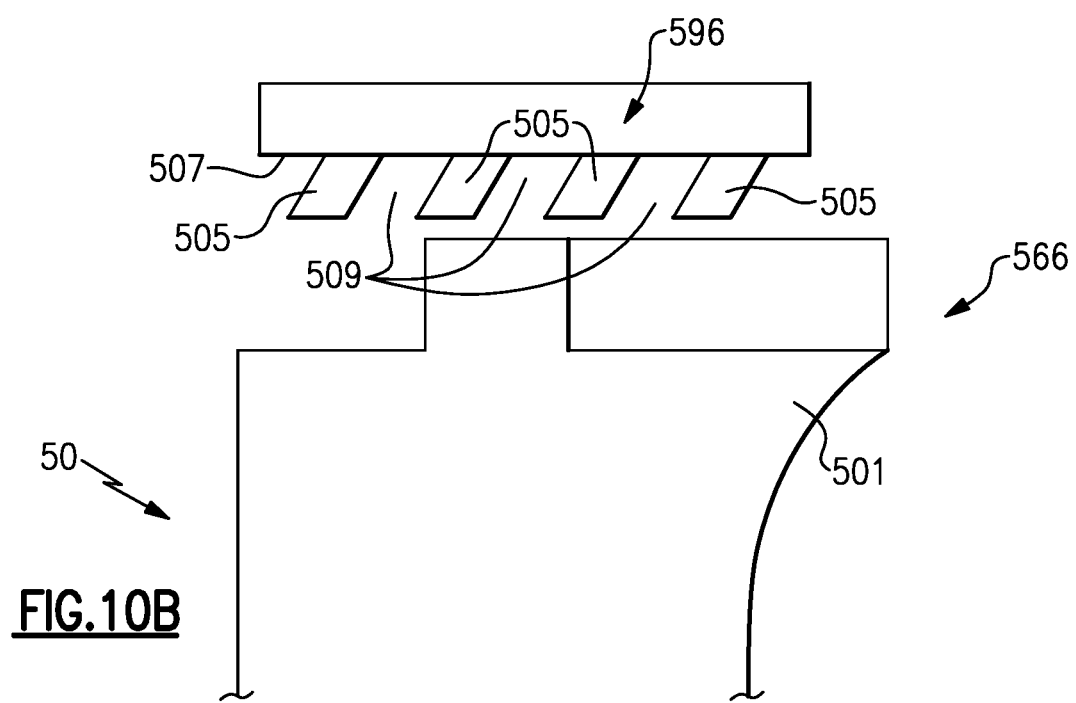

FIGS. 10A and 10B illustrate yet another tip wall 566 of an airfoil 50. In this embodiment, the tip wall 566 is positioned relative to an air seal 596. The air seal 596 is positioned radially outward of the tip wall 566 to minimize clearances at the tip wall 566.

In one embodiment, the air seal 596 is a grooved BOAS that includes a plurality of projections 505 that extend inwardly from a radially inner surface 507 of the air seal 596. Grooves 509 extend between adjacent projections 505 and define pockets for circulating leakage airflow along a circuitous path. The "grooved" air seal 596 cooperates with the tip wall 566 to minimize clearances and overall tip leakage that may occur between the airfoil 50 and the air seal 596. Although shown angled in this embodiment, the projections 505 and/or grooves 509 can be at any angle of 90° or less. In addition, each projection 505/groove 509 may not necessarily extend at the same angle. Furthermore, although the projections 505/grooves 509 are shown positioned axially relative to one another in FIGS. 10A and 10B, these features could be circumferentially arranged. Other arrangements are also contemplated.

Referring to FIG. 10B, the tip wall 566 could optionally include one or more winglets 501 (similar to those described in FIGS. 9A, 9B and 9C). The combination of a "grooved" air seal 596 and the winglets 501 desensitizes the mechanical tip clearance of the tip wall 566. Other tip wall embodiments could alternatively be used in combination with a grooved BOAS.

Figure 11A:
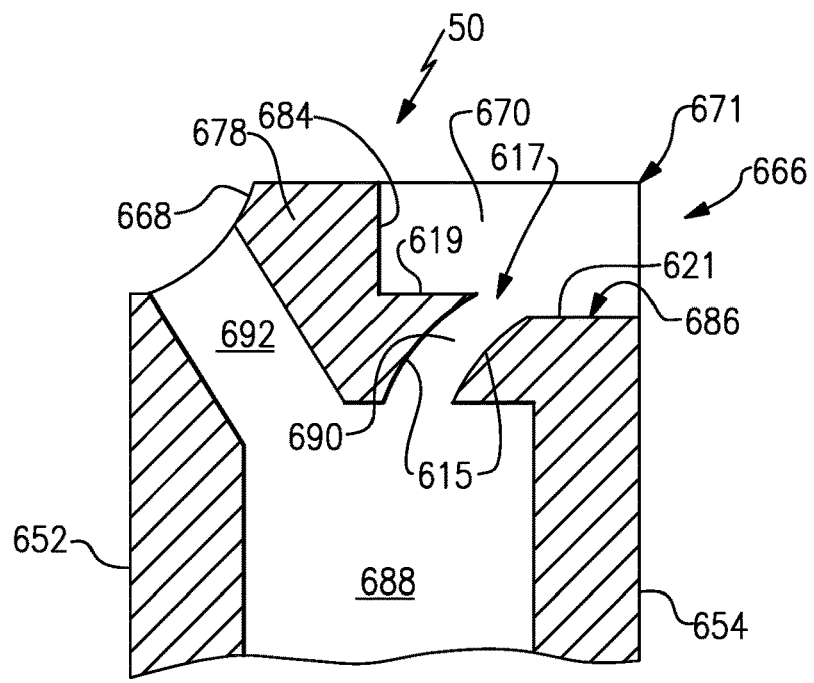
FIGS. 11A and 11B illustrate yet another tip wall configuration.
Figure 11B:
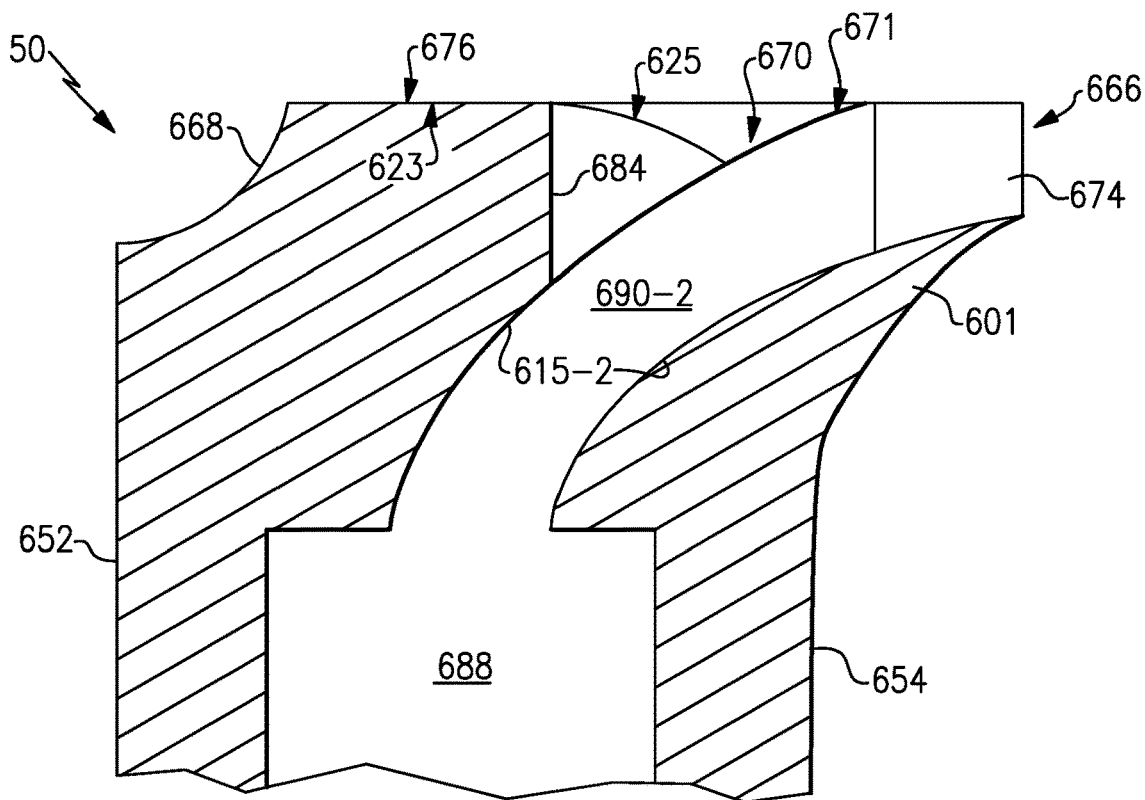

FIGS. 11A and 11B illustrate additional embodiments of a tip wall 666. The tip wall 666 can include a pressure sidewall 652, a suction sidewall 654, a tip shelf 668, a tip leakage control channel 670, a tip leakage control vane 671, a control channel floor 686, an internal cooling cavity 688, a channel cooling aperture 690, and, optionally, a tip shelf cooling aperture 692 (shown omitted in FIG. 11B).

In this embodiment, the channel cooling aperture 690 includes a curvature 615. The curvature 615 directs airflow at a specific angle into the tip leakage control channel 670 from the internal cooling cavity 688 located inside of the airfoil 50. In the embodiment shown in FIG. 11A, the channel cooling aperture 690 opens through the control channel floor 686 and divides the floor 686 into a stepped surface 617 in order to accommodate the curvature 615 of the channel cooling aperture 690. The stepped surface 617 includes a first surface 619 that is elevated relative to a second surface 621. The first surface 619 extends from a tip rib suction side 684 of a tip rib 678, while the second surface 621 extends from the suction sidewall 654.

Referring to FIG. 11B, a channel cooling aperture 690-2 with curvature 615-2 extends further into the tip leakage control channel 670 than the FIG. 11A embodiment. In one embodiment, the channel cooling aperture 690-2 extends to an outlet 674 of the tip leakage control channel 670 and is used in conjunction with a winglet 601 that extends from the tip leakage control vane 671 at the suction sidewall 654 of the tip wall 666. The channel cooling apertures 690, 690-2 may be individual holes or could be continuations of the internal cooling cavity 688, such as a slot, etc.

In another embodiment, a tip outer surface 676 of the tip wall 666 includes a first surface 623 and an angled surface 625. The first surface 623 extends from the tip shelf 668 to the tip rib suction side 684 and may be at least partially flat. The angled surface 625 may extend radially inwardly from the first surface 623 into the tip leakage control channel 670. The angled surface 625 establishes a relatively smooth surface for directing airflow into and through the tip leakage control channel 670 from a location outside of the airfoil 50.

The angled surface 625 may be utilized in a tip wall configuration either alone or in combination with any other features. This disclosure is not limited to the exact configuration shown in FIG. 11B, which shows, as a non-limiting embodiment, a tip wall that includes a combination of features including the angled surface 625, winglet 601 and channel cooling aperture 690 with curvature 615.

Figure 12:
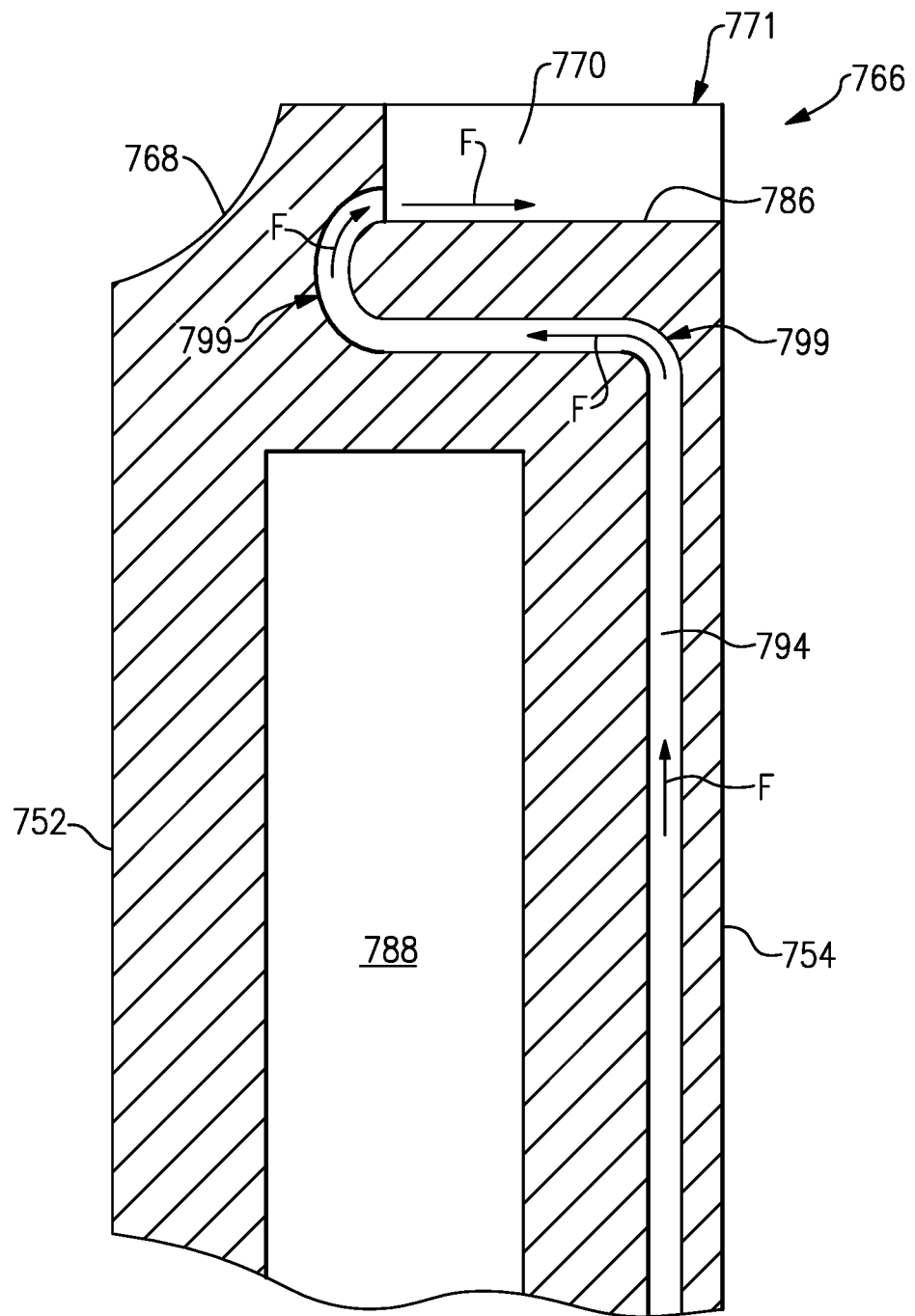
FIG. 12 illustrates another exemplary tip wall for an airfoil.

FIG. 12 illustrates yet another non-limiting embodiment of a tip wall 766. The exemplary tip wall 766 can include a pressure sidewall 752, a suction sidewall 754, a tip shelf 768, a tip leakage control channel 770, a tip leakage control vane 771, an internal cooling cavity 788, and one or more airfoil sidewall microcircuits 794 (or skin cores/radial flow passage skin cores).

In this embodiment, the airfoil sidewall microcircuit 794 feeds airflow F directly into the tip leakage control channel 770. The airfoil sidewall microcircuit 794 includes curved portions 799 that alter a flow direction of the airflow F within the airfoil sidewall microcircuit 794. In one embodiment, one of the curved portions 799 is located near an inlet 772 of the tip leakage control channel 770. In this way, the airflow F is aligned in the direction of the tip leakage control channel 770 as it is communicated into the inlet 772. Put another way, the airflow F is communicated generally parallel to a control channel floor 786 of the tip leakage control channel 770 by incorporating the curved portions 799 into the airfoil sidewall microcircuit 794.

Although the different non-limiting embodiments are illustrated as having specific components, the embodiments of this disclosure are not limited to those particular combinations. It is possible to use some other components or features from any of the non-limiting embodiments in combination with features or components from any of the other non-limiting embodiments.

It should be understood that like reference numerals identify corresponding or similar elements through the several drawings. It should also be understood that although a particular component arrangement is disclosed and illustrated in these exemplary embodiments, other arrangements can also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil, comprising:
a suction sidewall and a pressure sidewall, each sidewall extending spanwise from an airfoil base and extending chordwise between a leading edge and a trailing edge;
a tip wall extending chordwise from said leading edge to said trailing edge and joining respective outer spanwise ends of said suction and pressure sidewalls, including a tip rib extending chordwise along a pressure side of said tip wall;
a plurality of tip leakage control channels provided at said tip wall, each of said plurality of tip leakage control channels including a control channel floor that extends between a first control channel vane sidewall and a second control channel vane sidewall established by a corresponding tip leakage control vane, each of said tip leakage control vanes contiguous with a suction side surface of said tip rib, said plurality of tip leakage channels extending toward said trailing edge while extending toward said suction sidewall;
an internal cavity disposed between said suction sidewall and said pressure sidewall; and
an aperture extending from said internal cavity to at least one of said tip leakage control channels.

2. The airfoil as recited in claim 1, wherein said aperture includes a curvature.

3. The airfoil as recited in claim 1, wherein said aperture opens through said control channel floor.

4. The airfoil as recited in claim 1, wherein said aperture divides said control channel floor into a first surface that is elevated relative to a second surface.

5. The airfoil as recited in claim 1, wherein said plurality of tip leakage control channels are curved.

6. The airfoil as recited in claim 1, wherein said aperture extends to an outlet of said tip leakage control channel.

7. The airfoil as recited in claim 1, comprising a tip shelf disposed at a junction between said pressure sidewall and said tip rib.

8. An airfoil, comprising:
a suction sidewall and a pressure sidewall, each sidewall extending spanwise from an airfoil base and extending chordwise between a leading edge and a trailing edge;
a tip wall extending chordwise from said leading edge to said trailing edge and joining respective outer spanwise ends of said suction and pressure sidewalls, including a tip rib extending chordwise along a pressure side of said tip wall;
a plurality of tip leakage control channels provided at said tip wall, each of said plurality of tip leakage control channels including a floor that extends between a first control channel vane sidewall and a second control channel vane sidewall established by a corresponding tip leakage control vane, each of said tip leakage control vanes contiguous with and extending from a suction side surface of said tip rib, each of said plurality of tip leakage control channels extending toward said trailing edge while extending toward said suction sidewall; and
an airfoil sidewall microcircuit formed in either said suction sidewall or said pressure sidewall and in fluid communication with an inlet of each of said plurality of tip leakage control channels.

9. The airfoil as recited in claim 8, wherein said airfoil sidewall microcircuit includes at least one curved portion configured to alter a flow direction of said fluid within said airfoil sidewall microcircuit.

10. The airfoil as recited in claim 9, wherein said at least one curved portion communicates said fluid into said inlet in a direction parallel to a control channel floor of each of said plurality of tip leakage control channels.

11. The airfoil as recited in claim 8, wherein said airfoil sidewall microcircuit is formed in said suction sidewall.

12. The airfoil as recited in claim 8, wherein the at least one of said plurality of tip leakage control channel provides an outlet at a junction of the floor and the suction sidewall and between the first control channel vane sidewall and the second control channel vane sidewall.

13. The airfoil as recited in claim 12, wherein the floor extends spanwise from the inlet to the outlet.

14. An airfoil, comprising:
a suction sidewall and a pressure sidewall, each sidewall extending spanwise from an airfoil base and extending chordwise between a leading edge and a trailing edge;
a tip wall extending chordwise from said leading edge to said trailing edge and joining respective outer spanwise ends of said suction and pressure sidewalls and including a tip rib extending chordwise along a pressure side of said tip wall;
a plurality of tip leakage control channels provided at said tip wall, each of said plurality of tip leakage control channels including a floor that extends between a first control channel vane sidewall and a second control channel vane sidewall established by a corresponding tip leakage control vane, each of said tip leakage control vanes contiguous with and extending from a suction side surface of said tip rib, each of said plurality of tip leakage control channels extending toward said trailing edge while extending toward said suction sidewall;
an internal cavity disposed between said suction sidewall and said pressure sidewall;
a channel cooling aperture extending from said internal cavity at least one of said plurality of tip leakage control channels; and
an airfoil sidewall microcircuit formed in either said suction sidewall or said pressure sidewall.

15. The airfoil as recited in claim 14, wherein said channel cooling aperture feeds airflow to at least one of said plurality of tip leakage control channels and said airfoil sidewall microcircuit feeds airflow to a tip shelf cooling aperture of a tip shelf of the airfoil.

16. The airfoil as recited in claim 15, wherein said tip shelf cooling aperture is angled.

17. The airfoil as recited in claim 15, wherein said tip shelf cooling aperture is in fluid communication with said cavity.

* * * * *